(12) United States Patent
Sakarda et al.

(10) Patent No.: US 6,505,258 B1
(45) Date of Patent: Jan. 7, 2003

(54) COMPREHENSIVE INTERFACE BETWEEN BIOS AND DEVICE DRIVERS TO SIGNAL EVENTS

(75) Inventors: Premanand Sakarda, Acton, MA (US); Lan Wang, Singapore (SG)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/515,436

(22) Filed: Feb. 29, 2000

(51) Int. Cl.[7] ............................................. G06F 15/40
(52) U.S. Cl. ........................... 710/18; 710/15; 710/12; 710/103; 710/129; 711/4; 711/112; 711/115
(58) Field of Search ................................ 710/102, 103, 710/129, 15, 17, 18; 711/115, 112, 4

(56) References Cited

U.S. PATENT DOCUMENTS

| | | | |
|---|---|---|---|
| 5,579,491 A | | 11/1996 | Jeffries et al. ............... 710/103 |
| 5,664,118 A | * | 9/1997 | Nishigaki et al. ........... 710/103 |
| 5,664,119 A | | 9/1997 | Jeffries et al. ............... 710/103 |
| 5,781,798 A | | 7/1998 | Beatty et al. .................. 710/10 |
| 5,911,042 A | * | 6/1999 | Kugue ......................... 713/202 |
| 5,930,110 A | * | 7/1999 | Nishigaki et al. ........... 361/686 |
| 5,933,609 A | * | 8/1999 | Walker et al. ............... 710/103 |
| 5,974,473 A | | 10/1999 | Leavitt et al. .................. 710/8 |
| 6,062,480 A | * | 5/2000 | Evoy ........................... 235/492 |
| 6,189,050 B1 | * | 2/2001 | Sakarda ........................ 710/18 |
| 6,216,192 B1 | * | 4/2001 | Frame et al. ................ 710/129 |

OTHER PUBLICATIONS

*Plug and Play White Paper*, Windows®95, Compaq Computer Corporation, Aug. 1995, pp. 1–6.

* cited by examiner

Primary Examiner—Than Nguyen
(74) Attorney, Agent, or Firm—Conley, Rose & Tayon, P.C.

(57) ABSTRACT

A system is disclosed for allowing surprise insertion and removal of a peripheral device from the bays of a portable computer system. The peripheral device may be inserted or removed when the portable computer system is powered off, powered on, or in standby or sleep mode. The peripheral device may be any one of a multitude of devices corresponding to the IDE, ATAPI or FLOPPY standard. Insertion or removal of the device is operating system and BIOS independent. A constantly executing detection process determines when a peripheral device has been inserted into or removed from a bay. A multilevel device driver allows layered functionality and simplified interfacing between the operating system and computer system and peripheral hardware. Layering of the multilevel device driver allows simplified BIOS firmware. Identification and configuration of the peripheral device is handled by a IDE/ATAPI bridge device driver that is capable of recognizing any IDE, ATAPI or FLOPPY device inserted into a bay. The bridge device driver also updates CMOS registers, executes a type specific driver and device specific driver for the particular device and informs the operating system and file system.

11 Claims, 6 Drawing Sheets

FIG.3
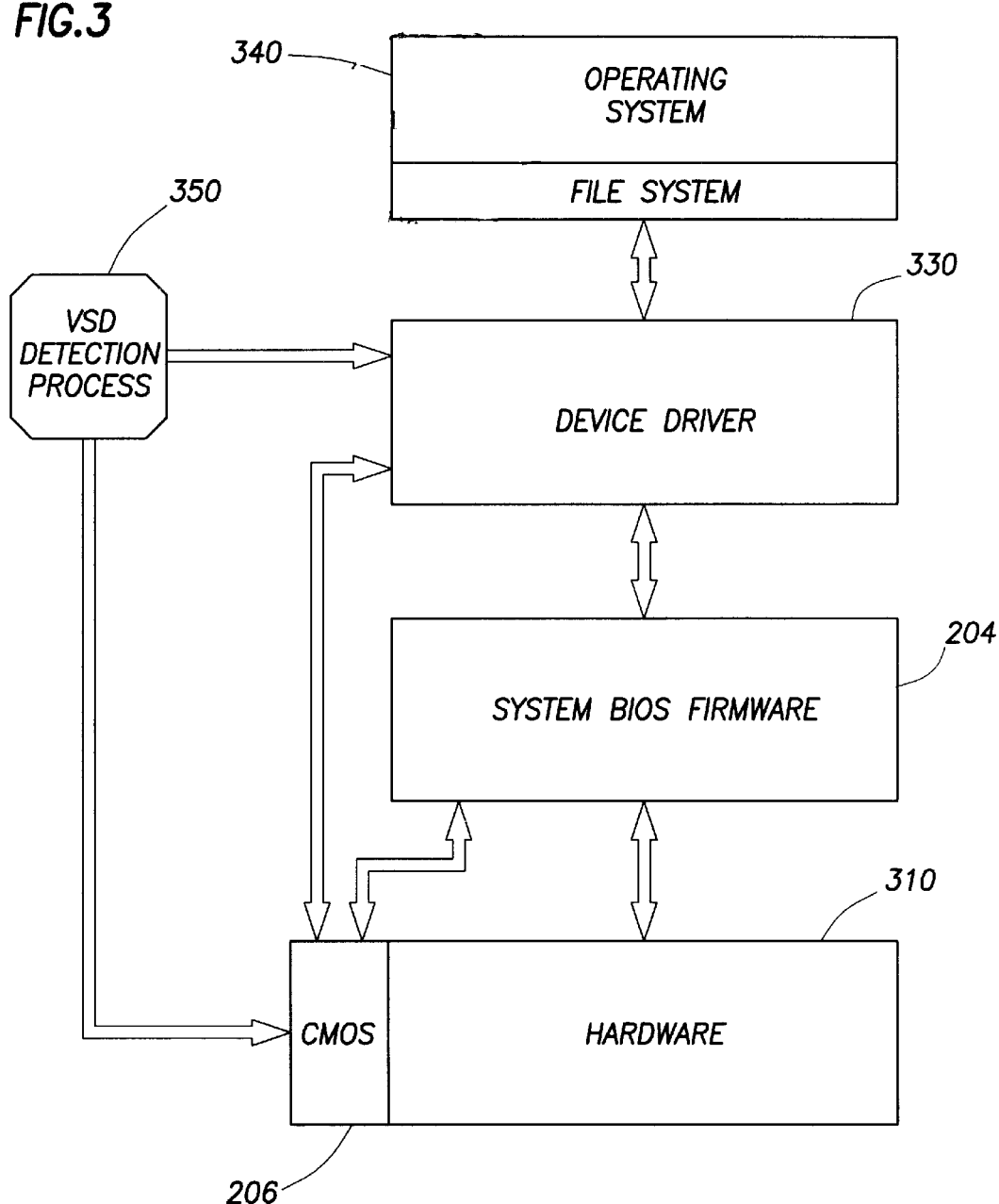
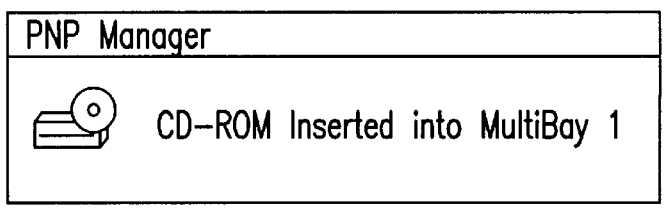
FIG.6

COMPREHENSIVE INTERFACE BETWEEN BIOS AND DEVICE DRIVERS TO SIGNAL EVENTS

CROSS-REFERENCE TO RELATED APPLICATIONS

The following pending applications are incorporated herein by reference:

1. Ser. No. 09/074,767 entitled "Method and Apparatus for Adding or Removing Devices from a Computer System Without Restarting" filed May 8, 1998;
2. Ser. No. 09/515,566 entitled "Hot Docking Drive Wedge and Port Replicator" filed Feb. 29, 2000.
3. Ser. No. 09/515,436 entitled "Surprise Hot Bay Swapping Of IDE/ATAPI Devices" filed Feb. 29, 2000.

STATEMENT REGARDING FEDERALLY SPONSORED RESEARCH OR DEVELOPMENT

Not applicable.

COPYRIGHT NOTICE

A portion of the disclosure of this patent document contains material which is subject to copyright protection. The copyright owner has no objection to the facsimile reproduction of the patent disclosure, as it appears in the Patent and Trademark Office patent files or records, but otherwise reserves all copyright rights whatsoever.

BACKGROUND OF THE INVENTION

1. Field of the Invention

The present invention relates generally to systems for enabling hot insertion and removal of peripheral devices from a computer bus. More particularly the present invention relates to an apparatus and method for implementing a system that allows device drivers to detect device changes occurring during hot docking and hot bay swapping. Still more particularly, the present invention relates to a system that can support hot bay swapping and hot docking for all IDE/ATAPI devices across all operating systems using a structured device driver architecture and reduced complexity Basic Input Output Subsystem (BIOS) firmware.

2. Description of the Prior Art

Many portable computer systems are based on the Intel 80x86 or Pentium series of microprocessors, or another compatible microprocessor, and are controlled by operating system software. In such systems, additional peripheral devices such as hard disk drives, CD-ROM drives, DVD Drives, CD-RW (re-writable) drives, tape backup drives, ZIP drives, LS-120 drives, and so forth are often added and removed by the user.

For example, an extra hard disk may be added to increase storage capacity. Generically referred to as "Plug and Play" (PnP), the addition of the hard disk is typically performed by powering-off the computer and inserting the extra hard disk into a bay designed to accept such a device. A bay is an external connector located on the housing of the portable computer that accepts a peripheral device connector. The bay connects to a bus such as an ISA (Industry Standard Architecture), EISA (Extended Industry Standard Architecture), or PCI (Peripheral Component Interconnect) bus linking the device to other components in the system. When the system is subsequently powered-on and "reboots", the presence of the new hard disk device is detected on the bus and the operating system configures itself and the new device for proper operation with one another and application programs. To remove the hard disk, the power is turned-off and the device is removed from the bay. When the operating system subsequently reboots, no configuration for the device takes place due to the absence (i.e., removal) of the device on the bus and the system will not permit communication with the absent device.

During device configuration, the system "enumerates" each device detected on each bus at system start-up. The enumeration process assigns a unique address or number to each device in order to properly access that device. The system also loads device driver software into memory for each device detected, if a driver is not already present. Device drivers provide the required instructions for proper device operation with the operating system and the applications that access the device.

In Plug and Play operating systems as described above, enumeration of new peripheral devices is supported by the operating system with the help of Basic Input Output Subsystem (BIOS) firmware. Peripheral device drivers written for PnP operating systems will not function without this operating system and BIOS support. In some computer systems, BIOS firmware does not include Plug and Play support and therefore a PnP operating system alone will not be able to recognize PnP devices. Under such operating systems, the user must manually disable all unused devices and corresponding IDE/ATAPI controller by manually setting flags in the control software or switches in the hardware.

The limitations of current computer systems and operating system as described above reduce the productivity of computer users. A user using a PnP compatible computer system and peripheral device who wishes to print a document and then fax the document but does not have any bays available for the fax machine must after printing shut down the computer system, remove a peripheral device from one of the bays, insert the fax/modem peripheral device into that bay, reinitialize the computer, call up the document, and proceed to transmit the document using the fax/modem peripheral. This operation is exceedingly inconvenient.

One prior art apparatus and method that overcomes the inherent limitations of Plug and Play systems is the "request/acknowledge hot swap" system. A computer system that supports the request/acknowledge hot swap scheme permits the installation and removal of peripheral devices after system power on and enumeration by the operating system. The computer user informs the operating system prior to performing the device insertion or removal, waits for the operating system acknowledgement that permits the operating system to partially power down the bus, and then performs the insertion or removal. The request/acknowledge scheme prevents corruption of data and protects the electrical integrity of the bus.

Request/acknowledge hot swap systems eliminate many of the disadvantages of Plug and Play systems but still cause user inconvenience due to the inherent delay caused by the request/acknowledge cycle. Another prior art apparatus and method, referred to as "surprise hot swapping" eliminates the need for the user to inform the operating system prior to performing the device insertion or removal. This method allows both power and data transfer interconnections between a computer bus and a newly installed device without requiring power to be removed from the bus. For example, computers and peripheral devices which adhere to the Personal Computer Memory Card International Association (PCMCIA) standard permit the hot insertion and hot removal of peripherals into the portable computers PCMCIA bays. The PCMCIA standard is presently in common use with notebook and laptop computers.

Like Plug and Play systems that require BIOS to implement functionality, a surprise hot swap system typically uses Basic Input Output Subsystem (BIOS) subroutines implemented by the computer system designer during system design to accommodate hot insertion and hot removal. BIOS subroutines continuously poll the PCMCIA peripheral bays to detect a peripheral device insertion or removal during system operation. Surprise hot swap systems are limited because the BIOS subroutines for such systems do not support hot insertion or hot removal for a wide array of bus standards such as IDE/ATAPI or PCI. Furthermore, BIOS hot insertion and hot removal systems are operating system dependent in that the operating system must recognize BIOS subroutine calls for hot insertion and removal and support requests for computer system resources from the subroutines. It would be advantageous to be able to surprise hot swap peripheral devices implemented on any bus standard in existing computer systems and across any operating system without having to modify the BIOS firmware and operating system that may be provided by companies other than the computer manufacturer.

For expanded capabilities, portable computers provide the option referred to as "hot docking" of coupling the portable computer to a docking station. In such scenarios, a fully operational (i.e., fully booted) portable computer may be inserted or "docked" to the docking station. The docking stations typically include a separate internal bus and associated bus controller and may contain one or more devices (e.g., Network Interface Card (NIC), CD-ROMS, etc.) inserted into device bays on the bus within the docking station.

Upon docking, a powered-up portable computer operating under a Plug and Play compliant operating system will recognize a new bus controller and its associated bus in the docking station and all peripheral devices that are inserted into bays on the new bus in the docking station, but only if the peripheral device is present (i.e., is inserted in a bay) at the time when the powered-up computer is docked with the docking station. For instance, if an operational portable is docked to a docking station containing a bus controller device, an inserted floppy disk drive and an inserted hard disk drive, the PnP compliant operating system will correctly detect and configure the additional bus controller device, as well as the inserted floppy and hard disk drives, even though the power to the portable was not reset and the portable was not restarted. The PnP compliant operating system will correctly enumerate and load device drivers, if necessary, for each device that is present on the newly added bus and will allow the devices to subsequently operate.

The docking station bays may permit "request/acknowledge hot swapping" and "surprise hot swapping" identical to the hot swap methods supported for portable computer bays. Both of these hot swapping schemes suffer from various limitations and disadvantages as described above.

Non-PnP operating systems that do not permit "request/acknowledge hot swapping" and "surprise hot swapping" contain no mechanism for detecting and configuring docking station bay devices inserted before or after the powered portable performs a hot dock with the docking station.

It would be advantageous to have a computer that permits hot swapping of peripherals and hot docking of portable computers independent of the operating system, Plug and Play, system BIOS and the type of bus architecture. The computer system would preferably implement BIOS firmware of simplified, reduced functionality and complexity and a layered device driver architecture permitting hot swapping and hot docking features without needing operating system support. Preferably, the system should permit six or more IDE or ATAPI type devices to simultaneously be hot plugged into the IDE or ATAPI portable computer bays or docking station bays. Despite these and other readily apparent advantages of such a system, to date no such system is known to exist.

BRIEF SUMMARY OF THE INVENTION

The present invention solves the shortcomings and deficiencies of the prior art by providing a computer system that permits hot docking of a portable computer into a docking station and hot swapping of peripheral devices connected to the portable computer or docking station. In addition, the computer system allows six or more IDE/ATAPI devices to be connected to the computer bus.

The present invention includes a processor executing an operating system. A secondary bridge connects through a PCI bus and a host bridge to a processor. The secondary bridge also connects through the host bridge and AGP bus to a display. CMOS registers and reduced complexity BIOS firmware are also coupled to the secondary bridge. A PCI-to-IDE/ATAPI bridge, also referred to as a peripheral device bridge, connects to the secondary bridge. A number of bays are connected to the IDE/ATAPI bridge and the bridge controls the bays and converts PCI standard signals to IDE/ATAPI. The bays can connect IDE, ATAPI, or FLOPPY devices. Examples of IDE devices are hard disk drive and ZIP removable hard disk drive. Examples of ATAPI devices are Compact Disc Read-Only-Memory (CD-ROM) device, Compact Disc ReWritable (CD-RW) device and Digital Video Disc (DVD) device. Examples of FLOPPY devices are a floppy disk drive and LS-120 drive.

The reduced complexity BIOS firmware has write-only permission to one of the CMOS register and is capable of low level communication with peripheral devices connected to the bays. The computer system also includes a multilevel device driver with read/write access to all CMOS registers, the device driver permitting interfacing and communication between the operating system and the BIOS firmware and peripheral device. The multilevel device driver is hierarchically structured and includes in order of functional closeness to the operating system a file system driver, Vendor Specified Driver (VSD) detection process driver, messaging process driver, bridge device driver, type specific driver, and device specific driver, the device specific driver functionally closest to the computer system hardware. A process in the computer system includes a memory address space, a software program that executes within that address space and system resources required by the software program to execute.

The processor executes the VSD detection process driver continuously within the computer system. The detection process driver informs the bridge device driver when a peripheral device is inserted or removed from one of the bays. The bridge also identifies the bay into which the peripheral device was inserted or removed. If a device is inserted into a bay, the bridge device driver identifies the peripheral device, writes the identity to CMOS registers, and calls a device specific driver for the device to permit communication between the device and the operating system. The portable computer system permits hot swapping of peripheral devices independently of the operating system.

Thus, any suitable operating system such as Microsoft Windows 3.0™, Microsoft Windows 3.1™, Microsoft Windows 95™, Microsoft Windows 98™, Microsoft Windows NT™, Microsoft Windows 2000™, DOS™, UNIX™, along with its flavors LINUX™, Red Hat UNIX™ and UNIX™ equivalent vendor specific operating system (HPUX™, IBM AIX™, etc . . . ), MVS™, and VMS™ will allow hot swapping.

The portable computer system can connect to a docking station through a PCI bus docking connector. The docking station includes a number of bays controlled by a second IDE/ATAPI bridge device in the docking station. As the processor executes the detection process driver in the portable computer, the detection process driver identifies any devices present in the docking station after the portable computer docks with the docking station. The detection process driver can also recognize any IDE/ATAPI/FLOPPY devices that are inserted or removed into a bay of the docking station even if the devices are inserted after docking. After detecting insertion or removal of a peripheral device, the detection process driver informs the bridge device driver of the insertion or removal and the identity of the bay. The device driver identifies the peripheral device, writes the identity to a CMOS register, and calls a type specific driver and device specific driver for the device to permit communication between the device and a operating system executing on the portable computer CPU.

To recognize hardware changes in a powered computer system for the present invention involves generating a SMI interrupt when a peripheral device is inserted or removed into a bay. Next, a detection process driver determines whether the peripheral device was inserted or removed and the bay location of the device. The processor executes a IDE/ATAPI bridge device driver if the SMI interrupt is caused by the insertion of a peripheral device. The bridge device driver identifies the peripheral device and configures it for optimal performance. The bridge device driver also writes the identity of the peripheral device to a CMOS register, resets the SMI interrupt, and calls a device specific driver for the peripheral device to permit communication between the device and the operating system. If the SMI interrupt is caused by the removal of a peripheral device to which data has not been saved, the SMI handler and a messaging process inform the user of the unsaved data condition.

The BIOS firmware routines for handling a System Management Interrupt (SMI) for the present invention caused by hot docking or hot bay swapping involves determining if the interrupt is caused by a bay insertion or removal event. BIOS routines then determine which bay has changed status. The BIOS turn on power to the particular bay for an insertion event and turns off power for a removal event. Next, BIOS routines confirm that an IDE/ATAPI/FLOPPY device is being inserted or removed and then call low level read/write communication primitives to verify communication. A BIOS function initializes the bay in which the insertion or removal event occurred. The BIOS initialization routines also update a CMOS register to indicate that the swap or dock event occurred. Finally, a BIOS beep routine sounds three beeps to inform a user of a swap or dock event occurrence.

BRIEF DESCRIPTION OF THE DRAWINGS

For a detailed description of the preferred embodiments of the invention, reference will now be made to the accompanying drawings in which:

FIG. 3 depicts the interfacing between hardware and software in accordance with the preferred embodiment of the present invention;

FIG. 6 depicts a pop up message notifying the user that a peripheral device has been inserted into the portable computer.

Figure 1:
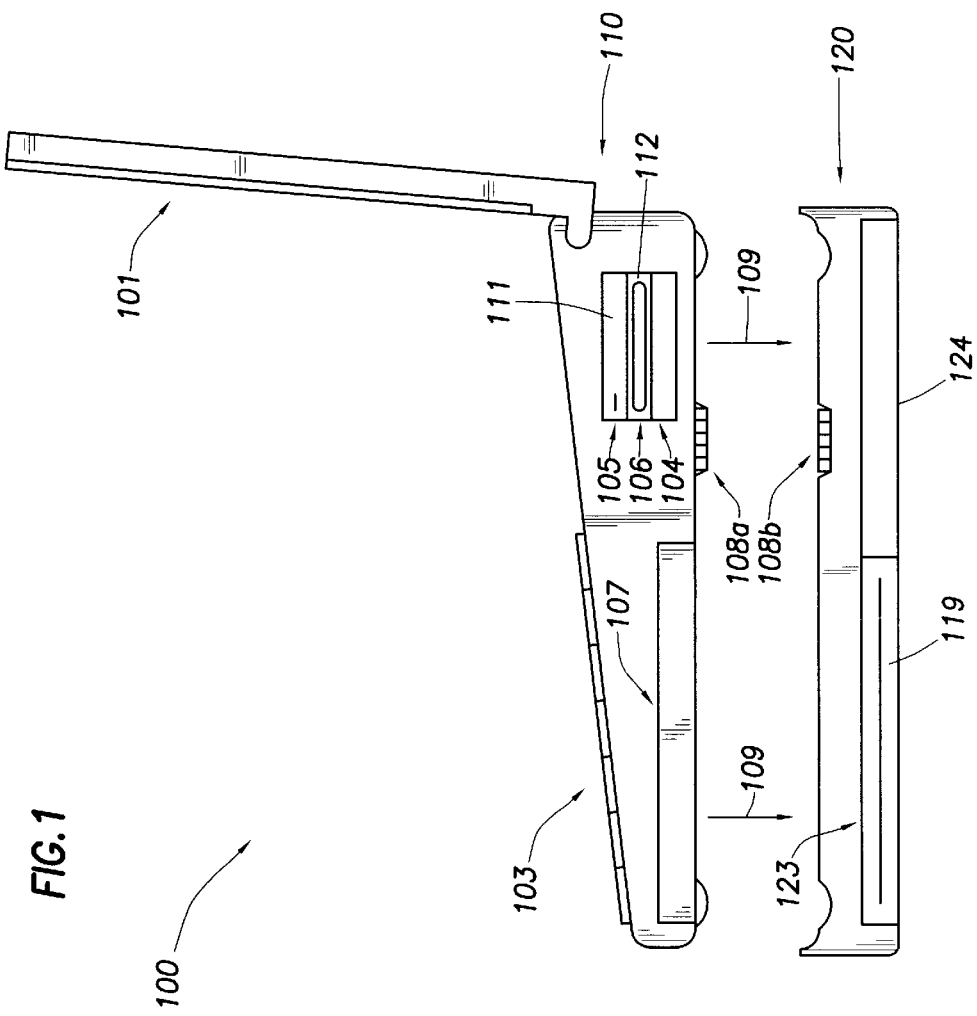
FIG. 1 illustrates an exemplary computer system and docking station in which the present invention may operate.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

FIG. 1 illustrates a computer system 100 constructed in accordance with the preferred embodiment. Computer system 100 comprises a portable computer 110 that includes a keyboard 103 for entering data, a display 101 for displaying data and information, system bays 104, 105, 106, and 107 for interfacing the computer 110 to various bus devices, and docking bay connector 108*a*. The portable computer 110 is preferably a personal computer, based on an Intel 80x86, Pentium, or Pentium II or other compatible microprocessor manufactured by Intel Corporation or another manufacturer.

While not required for the invention, computer system 100 is also illustrated with a docking station 120, which includes docking bay connector 108*b* and docking bays 123 and 124 for accommodating additional bus devices that can operate with the portable computer 110. Portable computer 110 is coupled or "docked" to docking station 120 by lowering the portable computer 110 onto docking station 120 in the direction of arrows 109. When docked, docking bay connectors 108a and 108b mate forming a data interface between at least one bus in the portable computer 110 and separate bus(es) (not shown in FIG. 1) within the docking station 120.

An example of portable computer 110 is the Armada E700 Laptop Computer, manufactured by Compaq Computer Corporation, the assignee of this invention. An example of docking station 120 is the ArmadaStation, also manufactured by Compaq Computer Corporation. The preferred embodiment of the invention is not limited to implementation in a portable computer and docking station configuration, but rather, is applicable to all types of "personal computer systems" including desktop and tower systems.

Bays 104–107 in the portable computer 110, and bays 123 and 124 in docking station 120 each contain an interface that permits a device, such as a hard or floppy disk drive, a CD-ROM device, a memory card, a modem, and so forth, to be quickly and easily connected to or removed from computer system 100. Bays 104–107 couple to a data bus within portable computer 110 (shown in FIG. 2), and bays 123 and 124 couple to an extension of the portable's bus or a separate data bus within docking station 120.

As illustrated, the portable computer 110 contains a hard disk drive 111 installed in bay 105 and a floppy disk drive 112 installed in bay 106. Bay 104 and bay 107 are empty or unused in this figure. The docking station 120 shown only has a single device installed; a CD-ROM drive 119 inserted in bay 123 while the bay 124 remains empty.

The hard disk drive 111 stores the operating system and associated application programs that execute on computer system 100. The operating system used in the preferred embodiment is Microsoft Corporation's Windows 95™, Windows 98™, Windows NT™, or Windows 2000™ operating system software, but is not limited to these operating systems and may also include Windows 3.0™, Windows 3.1™, DOS™, UNIX™, along with LINUX™, Red Hat UNIX™ and UNIX™ equivalent vendor specific operating system (HPUX™, IBM AIX™, etc.), MVS™, and VMS™. It is to be understood that this invention, since it functions independently of the operating system, may also be applied to future releases or compatible or related versions of any operating system software.

In accordance with the preferred embodiment of the invention, insertion or removal of devices to or from device bays 104 through 107 advantageously can be performed after the computer system 100 has been initialized and is fully operational. That is, computer system 100 need not be powered down to connect or remove peripheral devices. If the user docks the portable computer 110 with docking station 120, the operating system will reconfigure the portable computer 110 to allow access to any device(s) (i.e., disk drives, etc.) currently installed in the docking station 120 at the time of docking. The preferred embodiment of the invention further allows future insertion or removal of devices to and from device bus 124 in the docking station 120, without requiring the portable computer 110 to power down.

Figure 2:
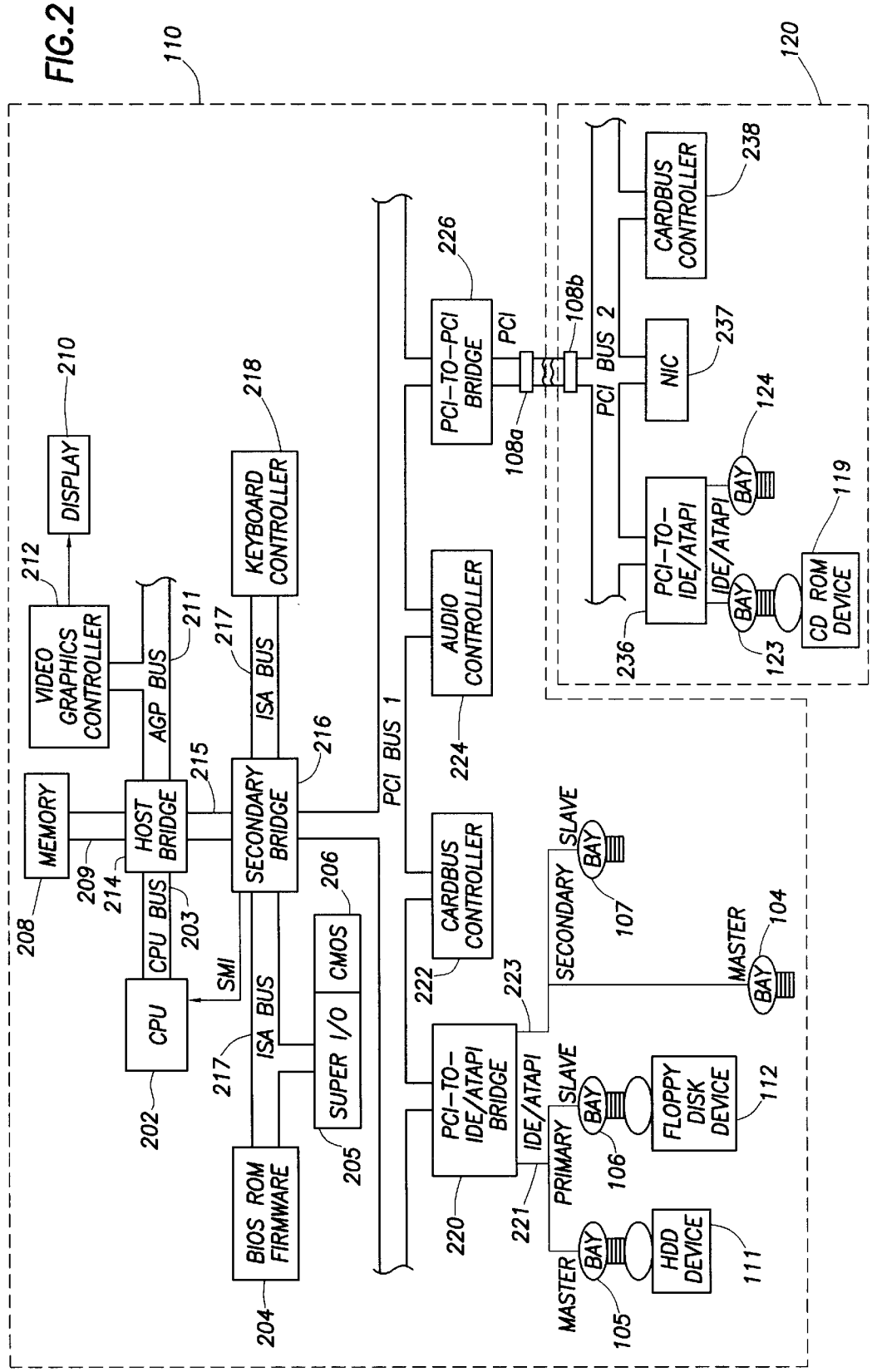
FIG. 2 shows a computer system implementing the hardware interface between BIOS and device drivers in accordance with the preferred embodiment of the present invention.

Referring now to FIG. 2, a computer system constructed in accordance with the preferred embodiment generally comprises a central processing unit ("CPU") 202 coupled to a host bridge logic device 214 over a CPU bus 203. CPU 202 may include any processor suitable for a portable computer, such as a Pentium class processor provided by Intel. A system memory 208, which preferably is one or more synchronous dynamic random access memory ("SDRAM") devices (or other suitable type of memory device), couples to host bridge 214 via a memory bus 209. Further, a graphics controller 212, which provides video and graphics signals to a built in display 210, couples to host bridge 214 by way of a suitable graphics bus, such as the Advanced Graphics Port ("AGP") bus 211. The display 210 may be a Cathode Ray Tube, liquid crystal display or any other similar visual output device. Host bridge 214 also couples to a peripheral or system bus 215. In the preferred embodiment shown in FIG. 2, peripheral bus 215 is a Peripheral Component Interconnect ("PCI") bus.

Various peripheral devices not shown can be included in portable 110 and connected to PCI bus 215. Such peripheral devices may include a modem, a network interface card ("NIC"), and other devices.

As such, host bridge 214 couples together CPU 202, system memory 208, graphics controller 212, and one or more devices coupled to PCI bus 215 by bridging CPU bus 203, memory bus 209, AGP bus 211, and PCI bus 215. The host bridge 214 permits the CPU 202 to read data from or write data to system memory 208. Further, through host bridge 214, the CPU 202 can communicate with PCI devices on PCI bus 215 (not shown), and similarly, PCI device 212 can read data from and write data to system memory 208 via the host bridge 214. The host bridge preferably contains memory controller and arbiter logic (not specifically shown) to provide controlled and efficient access to system memory 208 by the various devices in portable 110 such as CPU 202 and the various PCI devices. A suitable host bridge is the 82443BX Host Bridge/Controller provided by Intel and described in the Intel® 440BX AGPset: 82443BX Host Bridge/Controller datasheet dated April, 1998 which is incorporated herein by reference in its entirety.

Referring still to FIG. 2, portable computer 110 also includes a secondary bridge logic device 216 coupled to the PCI bus 215. The secondary bridge 216 preferably is an 82371AB PCI-to-ISA/IDE/ATAPI XCELERATOR (PIIX4E) device provided by Intel and described in the 82371AB PCI-to-ISA/IDE/ATAPI XCELERATOR data sheet incorporated herein by reference in its entirety. In FIG. 2, PCI-to-IDE/ATAPI Bridge 220, also referred to as a peripheral device bridge, is drawn separate from the secondary bridge device 216 for ease of explanation and illustration but is typically implemented as a portion of the secondary bridge device. As shown, the PCI-to-IDE/ATAPI bridge 220 preferably includes a primary Integrated Drive Electronics ("IDE")/AT Attachment Packet Interface ("ATAPI") bus 221 coupled to a master hard drive device 111 via connector bay 105 and a slave floppy disk device 112 via connector bay 106. Secondary bridge 216 and its sublogic PCI-to-IDE/ATAPI bridge 220 also includes a secondary IDE/ATAPI bus 223 that attaches to connector bay 104 and 107. The secondary bridge 216 also provides support for an Industry Standard Architecture ("ISA") bus 217. A Basic Input/Output System Read Only memory ("BIOS ROM") firmware device 204 and a keyboard controller 218 couple to secondary bridge 216 via the ISA bus 217.

The BIOS ROM includes firmware that is executed by the CPU 202 and which provides low level functions, such as access to the hard disk device 111. The BIOS firmware also contains the instructions executed by CPU 202 to conduct System Management Interrupt (SMI) handling and Power-On-Self-Test ("POST") in the portable computer 110. During the boot up process, CPU 202 copies the BIOS to system memory 208 to permit faster access.

The super I/O device 205, which preferably is a 97338VJG provided by National Semiconductor, provides various inputs and output functions. For example, the super I/O device 205 may include a serial port and a parallel port (both not shown) for connecting peripheral devices that communicate over a serial line or a parallel pathway. Super I/O device 205 preferably also includes a memory portion 206 in which various parameters can be stored and retrieved. These parameters may be system and user specified configuration information for the computer system such as identity of bay devices and whether the portable computer 110 is docked to docking station 120. The memory portion 206 in National Semiconductor's 97338VJG is a complementary metal oxide semiconductor ("CMOS") memory portion. Memory portion 206, however, can be located elsewhere in the system.

The keyboard controller 218 preferably is an H8 controller manufactured by Hitachi. In addition to providing support for a keyboard (not shown), keyboard controller 218 receives input from pointing device (not shown). The keyboard controller 218 processes input signals from the keyboard and pointer and provides that information to the CPU 202 via the ISA bus 217, secondary bridge 216, PCI bus 215, host bridge 214 and CPU bus 203 so that the CPU 202 can respond to the input signals as is deemed appropriate (e.g., displaying an alphanumeric character on the display 210 after that character is pressed on the keyboard).

Portable computer 110 is designed to dock with docking station 120. PCI-to-PCI bridge 226 couples to PCI Bus 2 through the docking connectors 108a and 108b. PCI Bus 2 couples to PCI-to-IDE/ATAPI bridge 236, NIC (Network Interface Card) controller 237, and Cardbus controller 238. Bay 123 and bay 124 connected to the primary and secondary channels respectively permit the use of peripheral devices when the portable computer is docked with the docking station. PCI Bus 2, PCI-to-IDE/ATAPI bridge, NIC controller, and Cardbus controller are located in the docking station 120, thus allowing greater flexibility without adding weight to the portable computer 110.

The operation of various components in the computer system shown in FIG. 2 will now be described with reference to FIG. 3. The CPU 202 executes user application software and system firmware and software such as the operating system, device drivers and BIOS firmware. The System BIOS firmware 204 contains routines that permit direct interface with computer hardware as shown in FIG. 3. Generally, an application program under control of the operating system 340 makes a request for a resource. The operating system may send the request to the file system or initiate a call to the appropriate device driver 330 corresponding to the bridge that can service the request. A file system, which may be a program independent of the operating system or as shown in FIG. 3 for the preferred embodiment implemented as part of the operating system, processes the request and converts the data into an appropriate file format.

As described in greater detail below, the overall device driver architecture is multilayered with functionality being distributed piecewise over each layer. Device driver 330 preferably recognizes and supports most, if not all, standard IDE and ATAPI compatible peripheral devices. The device driver then makes a software call to a system BIOS routine 204 which then directly accesses computer hardware and peripherals 310 to complete the request. In the preferred embodiment, as shown in FIG. 3, the BIOS firmware 204 is permitted to write to a CMOS register 206 that stores configuration information for a device insertion or removal event into a bay and for docking/undocking to a docking station. Furthermore, in the preferred embodiment, the device drivers 330 may directly read from or write to CMOS registers 206 independent of the BIOS or operating system as shown in FIG. 3. In the preferred embodiment, a VSD detection process driver 350 can read directly from the CMOS registers 206 and inform device driver 330 of any changes to the CMOS registers. The CMOS registers 206, as described in greater detail below, contain information about the type of device present in a portable computer bay or docking station bay (i.e. Battery, Floppy drive, CD-ROM, DVD Drive, LS-120, etc.). The CMOS registers record when a change in a computer bay or docking bay occurs, and also record when a docking station gets connected or removed from the portable computer.

Referring back to the preferred embodiment shown in FIG. 2, the secondary bridge 216 and its sublogic PCI-TO-IDE/ATAPI bridge 220 converts PCI bus signals from the host bridge 214 into IDE/ATAPI output signals usable by peripheral devices. Because two PCI-to-IDE/ATAPI bridges 220 and 236 are present in the system when the portable computer is docked to a docking station, the bridge devices use different I/O ranges, memory locations, registers and other hardware devices to prevent conflicts from occurring. Furthermore, PCI-to-IDE/ATAPI bridge 236 in the docking station 120 is not limited to standard I/O resources as defined by the IBM PC-AT specification. The interrupt request used for this bridge is a PCI interrupt and is shareable with other devices.

The PCI-to-IDE/ATAPI bridges in the portable computer and docking station may support all types of ATAPI, IDE and FLOPPY peripheral devices. These peripheral devices include CD-ROM, DVD, LS-120, ZIP disks, hard disk drives and various types of floppy disk drives. However, although LS-120 and hard disk drives are hot swappable, the portable computer user should save all data currently in work before moving the device to perform a hot bay swap. Saving data before performing a hot bay swap protects the integrity of the data. If the user does hot swap a LS-120 or hard disk drive prior to saving the data, the device driver 330 shown in FIG. 3 for the particular device will report an error. This error will be passed to the operating system 340 for reporting to the file system.

As mentioned above, in the preferred embodiment the system hardware supports hot bay insertion and removal of all IDE/ATAPI devices. In FIG. 2, if a slave device is inserted into bay 106 or bay 107 then the slave device causes a GPIO (General Purpose Input/Output) pin on the bay and the pin's corresponding line to go high which causes an IDE/ATAPI reset to inform the respective master device that a slave device is on the same IDE/ATAPI channel. This reset signal is handled by the system BIOS and is only required for a IDE/ATAPI device that is being inserted and not for a Floppy device.

In the preferred embodiment, the PCI-to-IDE/ATAPI docking station bridge and docking bays shown in FIG. 2 permit hot docking and undocking. That is, the portable computer and docking station may be powered on and fully operational during a dock or undock event. Furthermore, in the preferred embodiment because of the flexibility and standardization of the PCI bus, the portable computer system can dock and undock with all types of currently existing and future docks.

Figure 4:
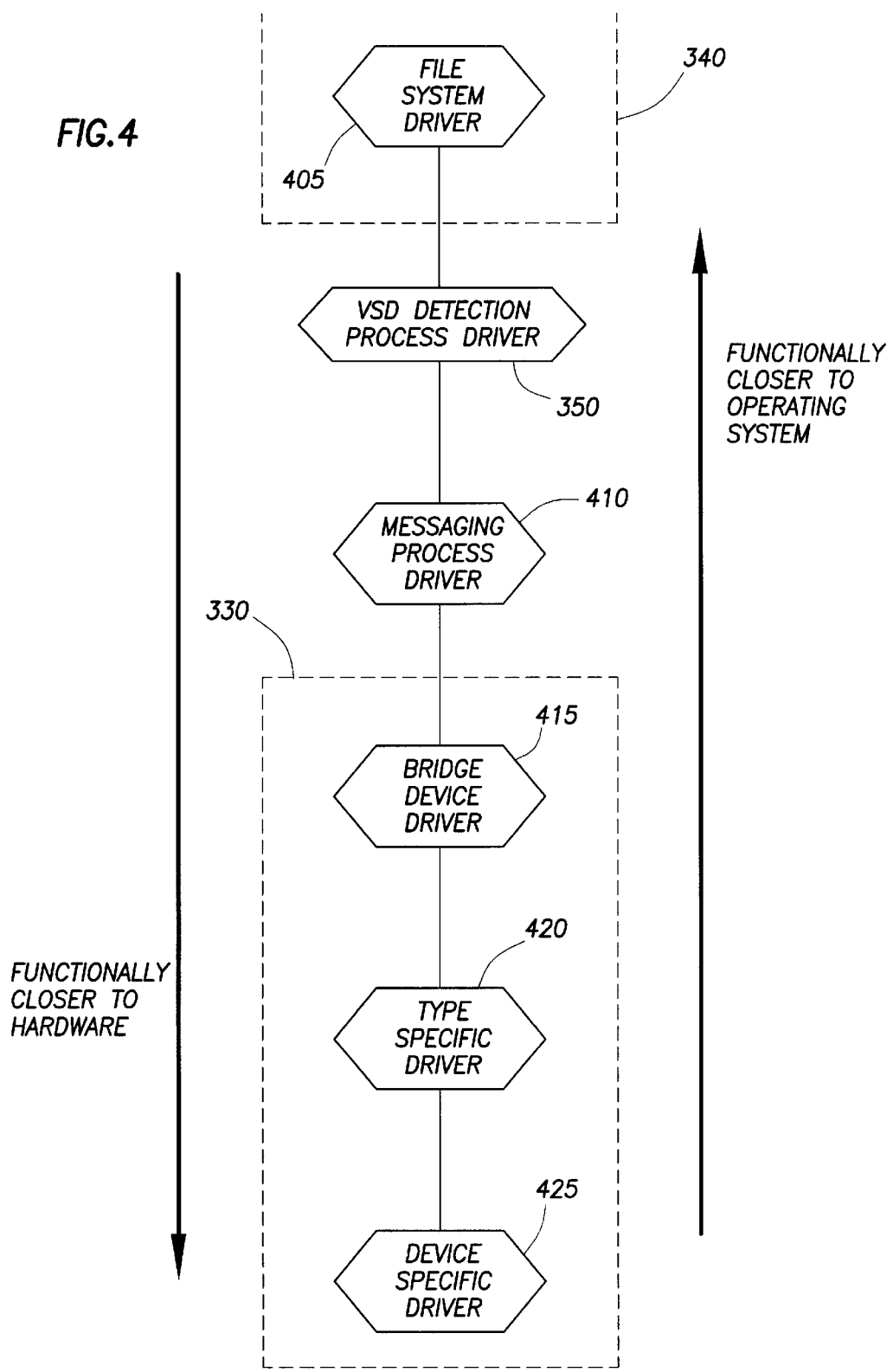
FIG. 4 depicts the multilayer device driver architecture in accordance with the preferred embodiment of the present invention.
Figure 5:
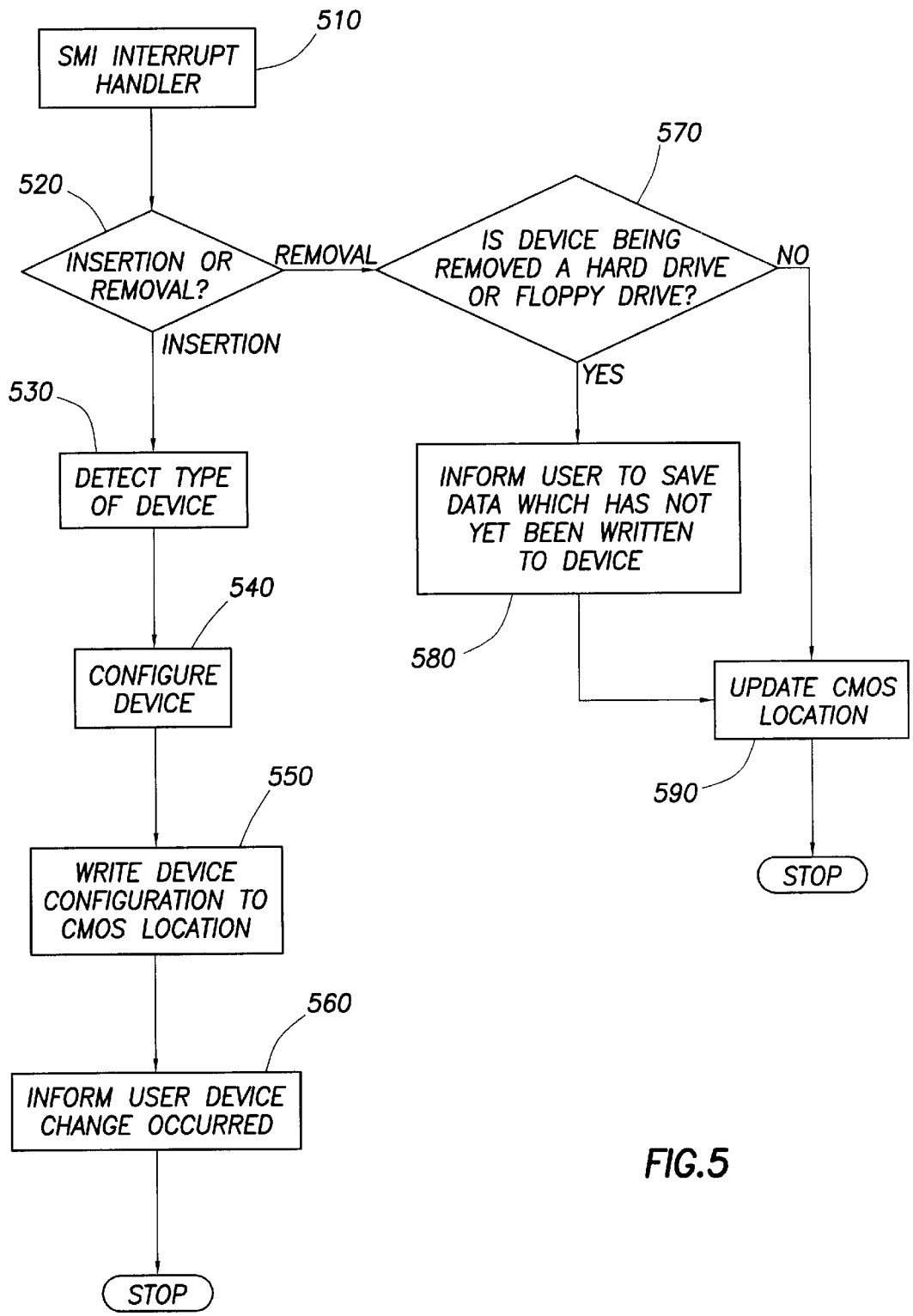
FIG. 5 is a flow chart illustrating processing of insertion or removal of a peripheral device.

The device driver architecture for the preferred embodiment will now be described with reference to FIG. 4. Application programs communicate with a file system driver 405 in the operating system 340. The file system driver processes Input/Output requests from applications and initiates low level I/O requests. A detection process driver 350 continuously executing reads directly from CMOS register locations 206 and informs device driver 330 of any changes to the CMOS registers. The detection process driver is functionally close to the operating system due to its limited ability to read the BIOS (no write privileges). Similarly, a message processing driver capable of reading CMOS register locations (but not writing) and communicating directly with the operating system continuously executes to determine when a insertion or removal event has occurred and the type of device inserted or removed. The messaging process driver displays a pop up dialogue message box to the user as shown in FIG. 5 after the peripheral device has been identified.

In the preferred embodiment, the device driver 330 is permitted both read/write access to the CMOS register locations and is thus functionally closer to the system hardware and BIOS. The device driver consists of a bridge device driver 415, a type specific driver ("TSD") 420, and a device specific driver 425. A bridge device driver executes at startup for each IDE/ATAPI bridge that is detected. The type specific driver allows interaction with all devices of a particular device type (e.g. all CD-ROM devices, all hard disk devices) and executes after the bridge device driver has identified the type of device. The TSD validates incoming I/O requests, converts logical file system requests to physical device parameter requests, and notifies the requesting application when the request is complete. Closest functionally to the hardware and BIOS is the device specific driver 425 which interacts with the type specific driver 420 and the bridge device driver 415 to communicate with the peripheral device. A device specific driver for each device that may be connected to a bay is present on the hard disk drive of the computer system. This driver is called once the bridge device driver determines the exact type of device. Normally, the device specific driver is provided by the manufacturer of the peripheral device on floppy disk or CD-ROM and installed to the hard disk drive at the computer manufacturing facility or by the user. The device specific driver provides a peripheral device manufacturer with an efficient way to incorporate enhancements into the multilayered device driver hierarchy for the special features of the particular device. In addition, because of the hierarchical approach, the capabilities of the driver can be extended to new devices without modifying higher levels.

The multilayered functionality of the device driver in the preferred embodiment permits simplification of each layer as well as easier upgradeability and interchangeability. New devices not present at the time of the computer system design can be incorporated simply by installation of a new type specific driver and device specific driver. The layered approach permits supervisory higher level layers access to low level system hardware such as CMOS register locations while denying access to the actual peripheral device, thus preventing improper operation and damage of the hardware.

A hot bay insertion or removal event for the preferred embodiment will now be described with reference to FIG. 5. The device driver for each PCI-to-IDE/ATAPI bridge and BIOS work in conjunction in detecting insertion or removal of a peripheral device. As shown in FIG. 5, each time an insertion or removal event occurs for a system bay connector or docking bay connector, an SMI (System Management Interrupt) is generated by the secondary bridge 216 as shown in FIG. 2 and communicated to the CPU 202 which causes the SMI handler 510 to execute. The interrupt handler code is stored in BIOS ROM Firmware 204 shown in FIG. 2. The SMI handler sets the appropriate change occurred bits in location 5E of CMOS 206 depending on which system bay or dock bay caused the interrupt. In the preferred embodiment location 5E Dock/Bay Change occurred bits, shown in Table 1 below, are used to determine if a bay device has changed during a hot dock of the portable to the docking station, including after POST, resume from suspend/standby/hibernation, and all other situations when a hot bay swap may have occurred. Equivalently, bits 6 and 7 may be implemented to define Docking Change Occurred and Undocking Change Occurred respectively for a value 1 and Docking Change Enumerated and Undocking Change Enumerated respectively for a value of 0.

TABLE 1

CMOS Location 5E

| Value | 1 | 0 |
|---|---|---|
| Bit 0 | Bay 106 Change Occurred | Bay 106 Change Enumerated |
| Bit 1 | Bay 104 Change Occurred | Bay 104 Change Enumerated |
| Bit 2 | Bay 107 Change Occurred | Bay 107 Change Enumerated |
| Bit 3 | Bay 123 Change Occurred | Bay 123 Change Enumerated |
| Bit 4 | Bay 124 Change Occurred | Bay 124 Change Enumerated |
| Bit 5 | Dock/Undock Event Occurred | Dock/Undock Event Enumerated |
| Bit 6 | Reserved for future use | Reserved for future use |
| Bit 7 | Reserved for future use | Reserved for future use |

In the preferred embodiment, a VSD detection process driver, independent of the operating system, at a periodic interval of 1 second determines the state of the portable computer system. The detection process driver reads CMOS location 5E and locations 5B–5D (described below) to detect when a dock or bay change has occurred and whether the change is an insertion or removal. Once it detects that a change has occurred and the type of change, in the preferred embodiment, the detection process driver calls configuration manager to re-enumerate devices. Configuration manager keeps track of hardware resources and performs hardware system configuration. It may be implemented as part of the operating system or may be a completely separate program. Each PCI-to-IDE/ATAPI bridge has a driver that gets loaded at system boot. The system loads a driver for the docking station PCI-to-IDE/ATAPI bridge when the portable computer is docked into the docking station.

If an insertion change has occurred, step 520, configuration manager informs the IDE/ATAPI bridge driver that an insertion has occurred and the driver detects the type of bay device inserted in step 530, initializes the device after determining its capabilities and calls the device specific driver for that particular device. Because BIOS does not have a fast way to find out the type of bay device inserted, the ATA command method is used to identify the device type by the IDE/ATAPI driver. The ATA command method, specified in greater detail in *Information Technology—AT Attachment with Packet Interface Extension*, T13-1153D Technical Committee of Accredited Standards Committee NCITS, Peter T. McLean 1997, allows the IDE/ATAPI bridge driver to send a IDENTIFY DEVICE command to the device to receive parameter information from the device. The parameter information consists of 256 words of device identification information including the number of cylinders, number of logical heads, number of logical sectors per logical track, serial number, firmware revision, model number and similar identifying information. The IDE/ATAPI bridge driver, after identifying the device, then optimizes the device in step 540 for the best possible performance from the device by setting up the timing registers. Next in step 550 the driver sets the device type in the appropriate CMOS register as shown in Table 2 after determining the bay in which the change occurred.

TABLE 2

CMOS Location 5B

| Value Bits 7 6 5 4 for Bay 104 | Device | Value Bits 3 2 1 0 for Bay 106 | Device |
|---|---|---|---|
| 0 | No Device Present | 0 | No Device Present |
| 1 | Bay Battery | 1 | Bay Battery |
| 2 | Floppy Present | 2 | Floppy Present |
| 3 | IDE Device Present | 3 | IDE Device Present |
| 4 | CD-ROM | 4 | CD-ROM |
| 5 | DVD Drive Present | 5 | DVD Drive Present |
| 6 | LS-120 | 6 | LS-120 |
| 7 | Zip Drive | 7 | Zip Drive |
| 8 | Bay HDD | 8 | Bay HDD |
| 9 and up | Reserved for future devices | 9 and up | Rsvd. for future devices |

CMOS Location 5C

| Value Bits 7 6 5 4 for Bay 124 | Device | Value Bits 3 2 1 0 for Bay 123 | Device |
|---|---|---|---|
| 0 | No Device Present | 0 | No Device Present |
| 1 | Bay Battery | 1 | Bay Battery |
| 2 | Floppy Present | 2 | Floppy Present |
| 3 | IDE Device Present | 3 | IDE Device Present |
| 4 | CD-ROM | 4 | CD-ROM |
| 5 | DVD Drive Present | 5 | DVD Drive Present |
| 6 | LS-120 | 6 | LS-120 |
| 7 | Zip Drive | 7 | Zip Drive |
| 8 | Bay HDD | 8 | Bay HDD |
| 9 and up | Reserved for future devices | 9 and up | Rsvd. for future devices |

CMOS Location 5D

| Value Bits 7 6 5 4 for Dock Type | Device | Value Bits 3 2 1 0 for Bay 107 | Device |
|---|---|---|---|
| 0 | No Dock | 0 | No Device Present |
| 1 | Dock Type 1 | 1 | Bay Battery |
| 2 | Dock Type 2 | 2 | Floppy Present |
| 3 | Dock Type 3 | 3 | IDE Device Present |
| 4 | Future Dock Types | 4 | CD-ROM |
| 5 | Future Dock Types | 5 | DVD Drive Present |
| 6 | Future Dock Types | 6 | LS-120 |
| 7 | Future Dock Types | 7 | Zip Drive |
| | | 8 | Bay HDD |
| | | 9 and up | Rsvd. for future devices |

Finally, after the enumeration routine described above is complete, the IDE/ATAPI bridge driver clears the change occurred bits in CMOS location 5E for the appropriate bay location. The IDE/ATAPI driver then calls the device specific driver for the particular peripheral device.

Removal of a IDE/ATAPI peripheral device causes BIOS to set the appropriate bit in CMOS location 5E to indicate that a bay change has occurred. In the preferred embodiment, the VSD detection process driver after detecting this change makes a call to the configuration manager to re-enumerate devices. After enumeration is complete, the IDE/ATAPI bridge driver clears the appropriate bay location change occurred bits in CMOS location 5E and clears the appropriate CMOS register to indicate that no device is present for that bay. The IDE/ATAPI driver also requests the CPU to stop execution of the device specific driver.

For a removal event as shown in step 570 of FIG. 5, if a floppy disk drive or hard disk drive is removed while a read or write operation is occurring or if the computer system has unsaved data, then the device specific driver reports the error to the operating system and file system. The operating system takes remedial action to prevent corruption of the unsaved data. The SMI handler and a messaging process then inform the user in step 580. Finally, the CMOS locations are updated as shown in step 590.

The user is notified of an insertion or removal event by three short beeps and, as shown in FIG. 6, a pop up dialogue message box identifying the device, in this case a CD-ROM, for two seconds. The three beeps occur immediately following the SMI and are generated by the SMI handler. A messaging process driver then generates the pop up dialogue message box as shown in step 560 of FIG. 5. The messaging process may be part of the operating system (OS) or implemented separately from the OS. If messaging is implemented separately from the OS, then in the preferred embodiment, similar to detection process driver, the messaging process periodically polls CMOS locations to determine the current hardware profile and calls the pop up dialogue message after the IDE/ATAPI bridge driver has identified the device. If messaging is implemented as part of the operating system, then the pop up dialogue message occurs after a request from the IDE/ATAPI bridge driver to the OS.

In the preferred embodiment, the portable computer system can be docked to a plurality of different docking stations. A docking event causes a SMI that calls the SMI handler and sets bit 5 of CMOS location 5E. The Vendor Specific Driver (VSD) detection process driver, executing in the portable computer system, determines by reading bit 5 of CMOS location 5E that the portable computer has been docked to a docking station and calls configuration manager. Configuration manager on detecting the IDE/ATAPI bridge in the docking station loads a device driver for this bridge. The driver for the docking station IDE/ATAPI bridge is initialized to use a different set of resources from the IDE/ATAPI bridge in the portable computer to prevent any resource conflicts from occurring. The IDE/ATAPI bridge driver determines whether a bay device is present in either of the docking station bays and if so detects the type of bay device using the ATA method. Any devices that are present are then configured by the bridge driver for optimal performance. Finally, the IDE/ATAPI bridge driver updates CMOS locations 5B–5E to indicate the type of device and the dock type. The bridge driver also clears bit 5 of CMOS location 5E to indicate that the dock/undock event has been enumerated and calls the device specific drivers for the bay devices.

If the portable computer system is removed from the docking station, then a SMI interrupt is generated and the SMI handler sets bit 5 of CMOS location 5E indicating that a dock/undock event has occurred. The VSD detection process driver reads CMOS location 5E and calls configuration manager upon determining that a dock/undock event has occurred. The detection process driver informs configuration manager that the portable computer system is no longer docked and therefore the IDE/ATAPI bridge is not available and appropriately updates the hardware configuration to reflect this change. If undocking occurs while a read or write operation is taking place, then the device specific driver reports an error up the driver stack shown in FIG. 4 until the operating system and file system receive notice of the error. Detection process driver also informs the driver for the docking station IDE/ATAPI bridge that the peripheral device in the docking station bay is no longer present. The IDE/ATAPI bridge driver informs the operating system that the device is no longer available for usage and shuts down any device specific drivers.

Figure 7:
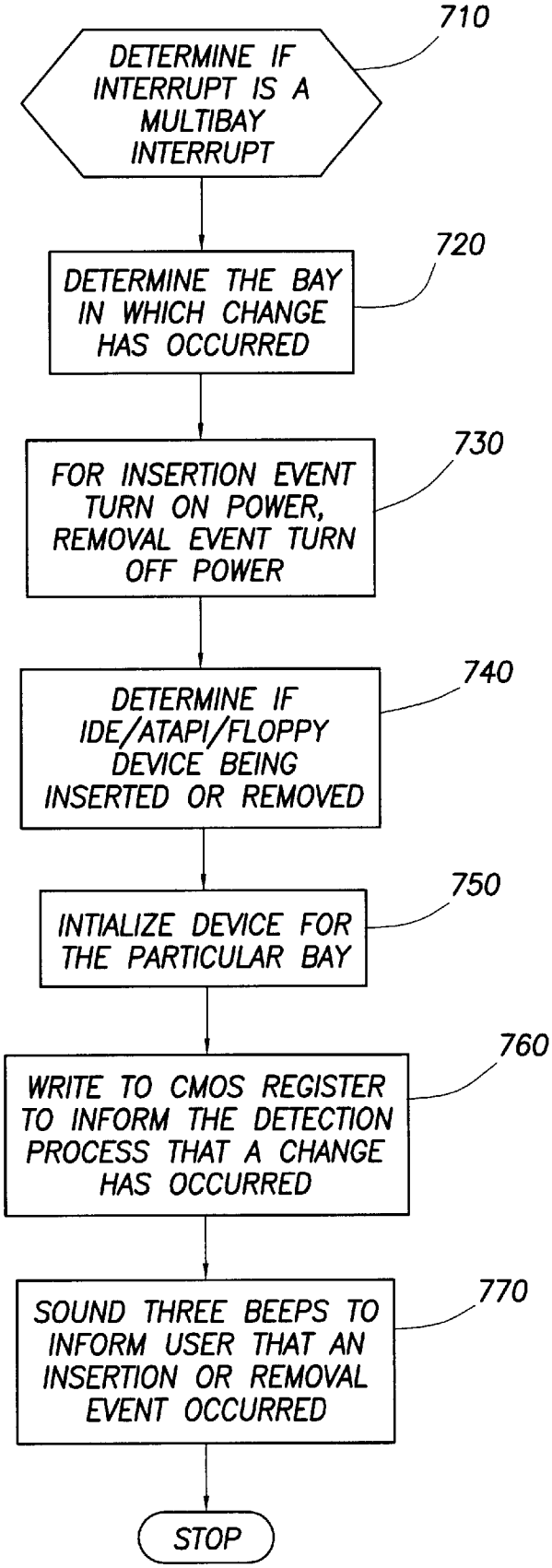
FIG. 7 is a flowchart illustrating the Basic Input Output Subsystem (BIOS) firmware handling of a System Management Interrupt (SMI).

The BIOS firmware routines for handling a System Management Interrupt (SMI) caused by hot docking or hot bay swapping will now be described with reference to the preferred embodiment shown in FIG. 7. In step 710, the BIOS determines if the interrupt is caused by a bay insertion or removal event. Insertion or removal of a device causes a line to go high which sets a bit that can be read by the BIOS SMI handler routine. The BIOS routines then determine which bay has changed status, step 720. The BIOS turn on power to the particular bay for an insertion event and turns off power for a removal event in step 730. Next, in step 740 BIOS routines confirm that an IDE/ATAPI/FLOPPY device is being inserted or removed and then call low level read/write communication primitives to verify communication. The BIOS in step 750 initializes the bay in which the insertion or removal event has occurred. A hardware reset for IDE/ATAPI devices is performed, primary and secondary channels are placed into tristate or removed from tristate (to allow communication), and device registers are updated. The BIOS initialization routines also update CMOS register location 5E in step 760 to inform the detection process driver that a bay or dock change has occurred. Finally, in step 770, a BIOS beep routine sounds three beeps to inform the user of a swap or dock event occurrence.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

Firmware BIOS Code Used in Implementation

The following assembly language firmware BIOS functions and subroutines are used in the preferred embodiment.

| Name of Function/Subroutine | Purpose |
| --- | --- |
| GetHotSwapSource | Find out which MultiBay has its status changed. |
| HandleIDEHardDriveSMI | Used to handle the hot plug-in/plug-out event from IDE device |
| HandleMBBuffers | Tristate/Untristate IDE channels accordingly. Enable multibay buffers as necessary. |
| WhereTheDrive | Determine bay in which hard drive is located. |
| PowerDownIdeDrives | Power down the IDE drives. |
| PowerUpIdeDrives | Power up the IDE drives. |
| Identify | Confirm IDE/ATAPI device and do read/write. |
| InitMultiBays | Initialize multibays to support devices hot or warm swap. |
| IsRataBayDevicesTableEstablished | Called by WhereTheDrive to determine bay. |
| MultibayBeep | Beep on multibay hot swap or hot dock. |

What is claimed is:

1. A computer system, comprising:
   a processor executing an operating system;
   a bridge logic device coupled to said processor;
   a display coupled to said bridge logic device;
   a plurality of CMOS registers coupled to said bridge logic device;
   a peripheral device bridge coupled to said bridge logic device;
   a plurality of bays connected to said peripheral device bridge, said peripheral device bridge controlling said bays;
   a detection process driver executing in the computer system, said detection process driver informing a bridge device driver associated with said peripheral device bridge when a peripheral device is inserted or removed from one of said bays and identifying the bay;
   wherein said bridge device driver identifies said peripheral device, writes the identity to one of said plurality of CMOS registers, and calls a device specific driver for said peripheral device to permit communication between the device and said operating system; and
   a messaging driver executing with the computer and providing a warning message to a user upon removal of a peripheral device when data has not been saved to the removed device.

2. The computer system of claim 1 wherein an Integrated Drive Electronic (IDE) device can be connected to said bay.

3. The computer system of claim 2 wherein said IDE device is a hard disk drive.

4. The computer system of claim 2 wherein said IDE device is a removable hard disk drive.

5. The computer system of claim 1 wherein an AT Attachment Packet Interface (ATAPI) device can be connected to said bay.

6. The computer system of claim 5 wherein said ATAPI device is a device selected from the group consisting of a compact disc read only memory device, compact disc rewritable device, and digital video disc device.

7. The computer system of claim 1 wherein a floppy disk device can be connected to said bay.

8. A portable computer system, comprising:
   a bridge logic device;

a sending docking connector coupled to said bridge logic device;

a processor coupled to said bridge logic device, said processor executing an operating system;

a plurality of CMOS registers coupled to said bridge logic device;

a docking station including a receiving docking connector, said receiving docking connector connecting to said sending docking connector and coupling said bridge logic device to a peripheral device bridge;

a plurality of bays in the docking station connected to said peripheral device bridge, said peripheral device bridge controlling said bays;

a detection process driver executing within the portable computer, said detection process driver informing a bridge device driver associated with said peripheral device bridge when a peripheral device is inserted or removed from one of said bays and identifying the bay;

wherein said bridge device driver identifies said peripheral device, writes the identity to one of said plurality of CMOS registers, and calls a device specific driver for said peripheral device to permit communication between the device and said operating system; and a messaging driver executing with the portable computer and providing a warning message to a user upon removal of a peripheral device when data has not been saved to the removed device.

9. A method for enumerating hardware changes in a powered computer system, comprising:

generating a System Management Interrupt (SMI) interrupt when a peripheral device is inserted into or removed from a bay;

determining whether said peripheral device was inserted or removed and the bay location of the device;

executing an bridge device driver to identify said peripheral device if said SMI interrupt was caused by the insertion of said peripheral device;

wherein said bridge device driver further configuring said peripheral device for optimal performance, writing the identity of the peripheral device to a CMOS register, resetting the SMI interrupt, and executing a device specific driver for said peripheral device to permit communication between the device and an operating system; and warning a user that data has not been saved if said SMI interrupt was caused by the removal of said peripheral device.

10. A computer system capable of being coupled to a peripheral device while the computer system is on and fully operational, comprising:

a processor;

a plurality of read/write registers accessible by said processor;

a peripheral bridge device coupled to said processor;

a plurality of bays coupled to said peripheral bridge device;

a means for detecting when a peripheral device is inserted into or removed from one of said bays;

a means for identifying the peripheral device; and a means for warning a user that data has not been saved when a peripheral device is removed.

11. The computer system of claim 10 further including a means to permit communication with the peripheral device if said peripheral device is inserted into a bay.

* * * * *